US012666367B2

(12) United States Patent
Cheng et al.

(10) Patent No.: US 12,666,367 B2
(45) Date of Patent: Jun. 23, 2026

(54) POWER CONTROL OF SIDELINK IN UNLICENSED SPECTRUM IN MOBILE COMMUNICATIONS

(71) Applicant: MediaTek Singapore Pte. Ltd., Singapore (SG)

(72) Inventors: Jun-Qiang Cheng, Beijing (CN); Tao Chen, Beijing (CN); Jing-Wei Chen, Hsinchu City (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 314 days.

(21) Appl. No.: 18/224,245

(22) Filed: Jul. 20, 2023

(65) Prior Publication Data

US 2024/0031945 A1    Jan. 25, 2024

(30) Foreign Application Priority Data

Jul. 22, 2022    (WO) ................ PCT/CN2022/107359
Jul. 13, 2023    (CN) .......................... 202310861004.8

(51) Int. Cl.
*H04W 52/24*        (2009.01)
*H04W 56/00*        (2009.01)

(52) U.S. Cl.
CPC ....... *H04W 52/242* (2013.01); *H04W 56/001* (2013.01)

(58) Field of Classification Search
CPC ............. H04W 52/242; H04W 56/001; H04W 52/367; H04W 52/383
See application file for complete search history.

(56) References Cited

U.S. PATENT DOCUMENTS

2023/0146928 A1* 5/2023 Hwang ............... H04W 52/325
                                                        370/329
2023/0239807 A1* 7/2023 Zeng ................. H04W 52/0216
                                                        455/522

* cited by examiner

*Primary Examiner* — Ayodeji O Ayotunde
(74) *Attorney, Agent, or Firm* — Andy M. Han; Han IP PLLC

(57) ABSTRACT

Examples pertaining to power control of sidelink (SL) on unlicensed spectrum (SL-U) in mobile communications are described. A user equipment (UE) communicates in a SL-U. The UE performs a transmit power control (TPC) such that a power spectral density (PSD) limit is not exceeded in communicating in the SL-U.

16 Claims, 3 Drawing Sheets

300

COMMUNICATE, BY A PROCESSOR OF A USER EQUIPMENT (UE), IN A SIDELINK UNLICENSED SPECTRUM (SL-U)

310

PERFORM, BY THE PROCESSOR, A TRANSMIT POWER CONTROL (TPC) SUCH THAT A POWER SPECTRAL DENSITY (PSD) LIMIT IS NOT EXCEEDED IN COMMUNICATING IN THE SL-U

320

300

COMMUNICATE, BY A PROCESSOR OF A USER
EQUIPMENT (UE), IN A SIDELINK UNLICENSED
SPECTRUM (SL-U)

310

PERFORM, BY THE PROCESSOR, A TRANSMIT POWER
CONTROL (TPC) SUCH THAT A POWER SPECTRAL
DENSITY (PSD) LIMIT IS NOT EXCEEDED IN
COMMUNICATING IN THE SL-U

320

POWER CONTROL OF SIDELINK IN UNLICENSED SPECTRUM IN MOBILE COMMUNICATIONS

CROSS REFERENCE TO RELATED PATENT APPLICATION(S)

The present disclosure is part of a non-provisional application claiming the priority benefit of China Patent Application No. 202310861004.8, filed 13 Jul. 2023 based on PCT Patent Application No. PCT/CN2022/107359, filed 22 Jul. 2022. The contents of aforementioned applications are herein incorporated by reference in their entirety.

TECHNICAL FIELD

The present disclosure is generally related to mobile communications and, more particularly, to power control of sidelink (SL) in unlicensed spectrum in mobile communications.

BACKGROUND

Unless otherwise indicated herein, approaches described in this section are not prior art to the claims listed below and are not admitted as prior art by inclusion in this section.

In wireless communications, such as mobile communications under the $3^{rd}$ Generation Partnership Project (3GPP) standards including $5^{th}$ Generation (5G) advanced and $6^{th}$ Generation (6G), sidelink (SL) transmitted in unlicensed/ shared spectrum (SL-U) is one of the most promising technologies. Considering the power control mechanisms for legacy SL and legacy New Radio unlicensed spectrum (NR-U) are different, the design for power control of SL-U is regarded as a critical issue, and should be addressed as a premise to guarantee the stable operations of SL-U. For example, effective isotropic radiated power (EIRP) and power spectral density (PSD) limits are required in some regions for transmission in an unlicensed spectrum. Per European Telecommunications Standards Institute (ETSI) regulation, the maximum mean EIRP and PSD in the 5150~5350 MHz band are limited to 23 dBm and 10 dBm/MHz, respectively, while in the 5470~5725 MHz band they are limited to 30 dBm and 17 dBm/MHz, respectively. For legacy SL, the existing power control mechanism only restricts the maximum transmit (Tx) power (e.g., 23 dBm) but does not consider the PSD limit. Accordingly, for SL-U designs, a new power control mechanism that takes PSD limit into consideration is needed. Therefore, there is a need for a solution of power control of SL-U in mobile communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

One objective of the present disclosure is propose schemes, concepts, designs, systems, methods and apparatus pertaining to power control of SL-U in mobile communications. It is believed that the above-described issue(s) would be avoided or otherwise alleviated by implementing one or more of the proposed schemes described herein. For instance, under one proposed scheme, power control for SL-U may involve excluding a sidelink synchronization signal block (S-SSB) from a SL resource pool (e.g., in legacy SL S-SSB occasions). Under another proposed scheme, power control for SL-U may involve including the S-SSB in the SL resource pool (e.g., in additional candidate S-SSB occasions).

In one aspect, a method may involve a user equipment (UE) communicating in a SL-U. The method may also involve the UE performing a transmit power control (TPC) such that a PSD limit is not exceeded in communicating in the SL-U.

In another aspect, an apparatus may include a transceiver and a processor coupled to the transceiver. The transceiver may be configured to communicate wirelessly. The processor may communicate, via the transceiver, in a SL-U. The processor may also perform, via the transceiver, a TPC such that a PSD limit is not exceeded in communicating in the SL-U.

It is noteworthy that, although description provided herein may be in the context of certain radio access technologies, networks and network topologies such as 5th Generation System (5GS) and 4G EPS mobile networking, the proposed concepts, schemes and any variation(s)/derivative(s) thereof may be implemented in, for and by other types of wireless and wired communication technologies, networks and network topologies such as, for example and without limitation, Ethernet, Universal Terrestrial Radio Access Network (UTRAN), E-UTRAN, Global System for Mobile communications (GSM), General Packet Radio Service (GPRS)/ Enhanced Data rates for Global Evolution (EDGE) Radio Access Network (GERAN), Long-Term Evolution (LTE), LTE-Advanced, LTE-Advanced Pro, Internet-of-Things (IoT), Industrial IoT (IIoT), Narrow Band Internet of Things (NB-IoT), and any future-developed networking technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to power control of SL-U in mobile communications. According to the present disclosure, a number of possible solutions may be implemented separately or jointly. That is, although these possible solutions may be described below separately, two or more of these possible solutions may be implemented in one combination or another.

Figure 1:
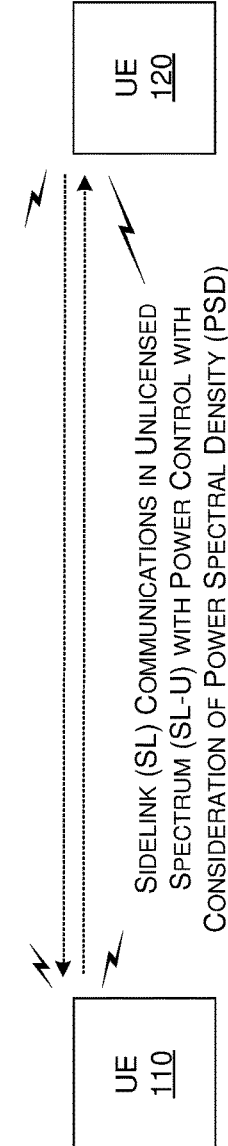
FIG. 1 is a diagram of an example network environment in which various solutions and schemes in accordance with the present disclosure may be implemented.
Figure 2:
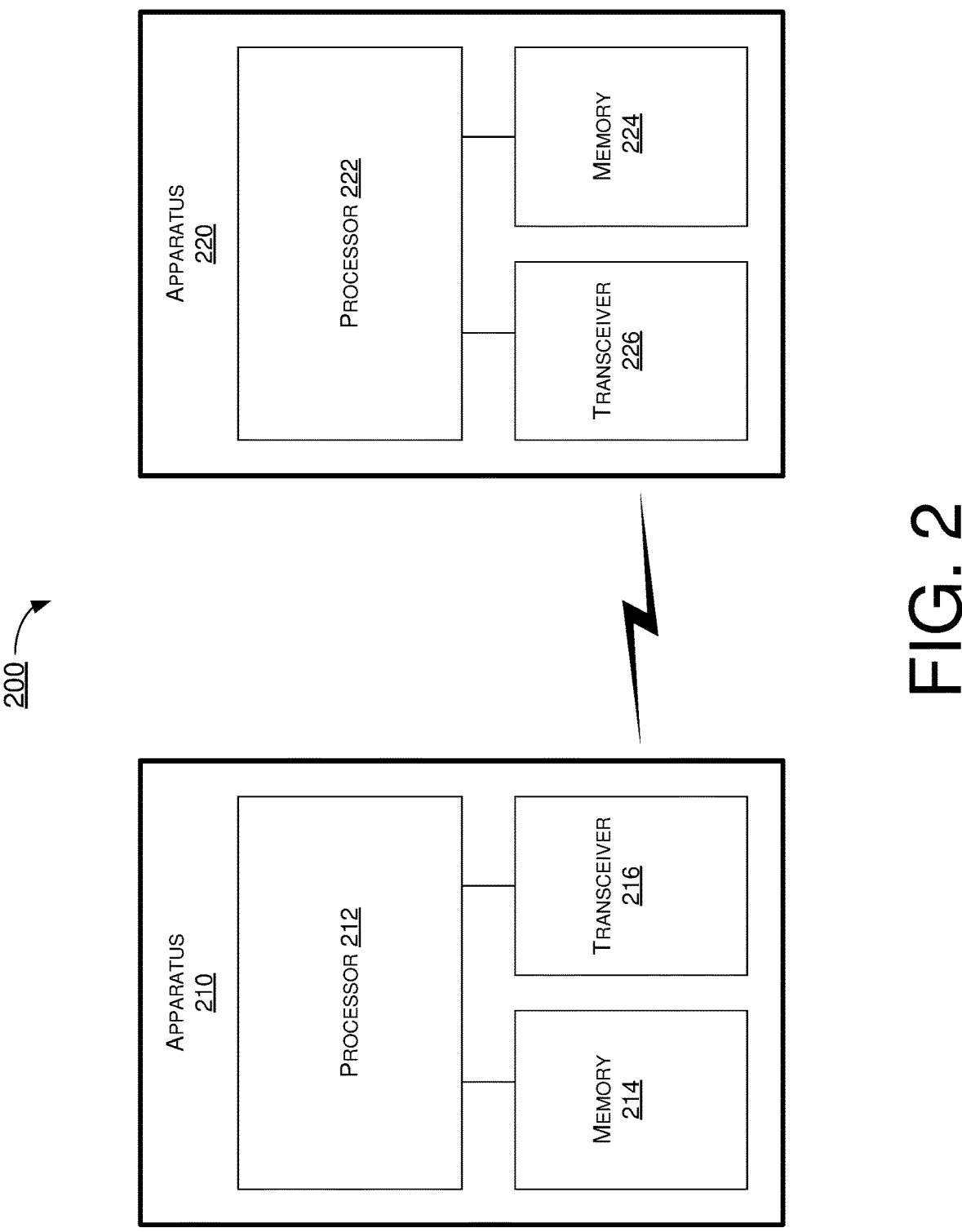
FIG. 2 is a block diagram of an example communication system in accordance with an implementation of the present disclosure.
Figure 3:
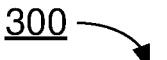
FIG. 3 is a flowchart of an example process in accordance with an implementation of the present disclosure.

FIG. 1 illustrates an example network environment 100 in which various solutions and schemes in accordance with the present disclosure may be implemented. FIG. 2~FIG. 3 illustrate examples of implementation of various proposed schemes in network environment 100 in accordance with the present disclosure. The following description of various proposed schemes is provided with reference to FIG. 1~FIG. 3.

Referring to FIG. 1, network environment 100 may involve a first UE (UE 110) and a second UE (UE 120) engaged in SL communications. Either or both of UE 110 and UE 120 may be a portable device, an IoT device or a vehicle. In network environment 100, UE 110 and UE 120 may implement various schemes pertaining to power control of SL-U in mobile communications in accordance with the present disclosure, as described below. It is noteworthy that, while the various proposed schemes may be individually or separately described below, in actual implementations each of the proposed schemes may be utilized individually or separately. Alternatively, some or all of the proposed schemes may be utilized jointly.

Under a first proposed scheme in accordance with the present disclosure, TPC for SL-U when S-SSB is excluded from a SL resource pool (e.g., resources used for data/control/feedback channels) may involve reusing a legacy SL power control formula with an additional consideration of PSD limit. For instance, the legacy SL power control formula with respect to legacy S-SSSB transmission power after a TPC mechanism may be expressed as follows:

$$P_{S-SSB} = \min\left(P_{MAX}, P_{O,S-SSB} + 10 \log_{10}\left(2^{\mu} \cdot M_{RB}^{S-SSB}\right) + \alpha_{S-SSB} \cdot PL\right)$$

Here, $P_{MAX}$ denotes a pre-configured maximum transmit power. In legacy S-SSB transmission occasions, $P_{MAX}$ may be defined in the 3GPP Technical Specification (TS) 38.101. Moreover, $P_{O,S-SSB}$ and $\alpha_{S-SSB}$ denote two (pre-)configured parameters associated with pathloss indicated in radio resource control (RRC) signaling. That is, $P_{O,S-SSB}$ denotes a P0 value of a pre-configured received power target assuming full pathloss compensation for downlink (DL) pathloss, and $\alpha_{S-SSB}$ denotes an alpha value for DL pathloss. In case that the parameter $P_{O,S-SSB}$ is not (pre-)configured, power control for S-SSB may be disable and $P_{S-SSB} = P_{MAX}$. Furthermore, $$M_{RB}^{S-SSB}$$

denotes the number of physical resource blocks (PRBs) used for the S-SSB.

Under the proposed scheme, PSD limit may be expressed as follows:

$$P_{MAX,PSD} = BW_{S-SSB} \times PSD_{MAX}$$

Here, $BW_{S-SSB}$ denotes a bandwidth of S-SSB transmission based on contiguous resource blocks (RBs) and/or interlaced RBs in units of MHz, and $PSD_{MAX}$ denotes a (pre-)configured maximum limit on PSD. Notably, in scenarios where S-SSB transmission is performed in multiple frequency segments (e.g., 20 MHz each) of a wider bandwidth (e.g., 80 MHz, 160 MHz, 320 MHz, 480 MHz or 640 MHz), $BW_{S-SSB}$ represents the total bandwidths or sum of the multiple frequency segments.

To be precise, the above equation may be expressed with the units aligned on both sides of the equation. That is, when numerical values are used on both sides of the equation, the above equation may be expressed as follows:

$$P_{MAX,PSD} = BW_{S-SSB} \times PSD_{MAX} \ [\text{mW}]$$

Alternatively, when dB values are used on both sides of the equation, the above equation may be expressed as follows:

$$P_{MAX,PSD} = 10 * \log10(BW_{S-SSB}) + PSD_{MAX} \ [\text{dB}m]$$

Moreover, the bandwidth of S-SSB transmission may be calculated by:

$$BW_{S-SSB} = M_{RB}^{S-SSB} * N_{sc}^{RB} * \Delta f$$

Here, $$M_{RB}^{S-SSB}$$

denotes a number of RBs for S-SSB, $$N_{sc}^{RB}$$

denotes a number of subcarriers per RB, and $\Delta f$ denotes subcarrier spacing (SCS). It is noteworthy that the above principle may be applied to the TPC of physical sidelink control channel (PSCCH), physical sidelink shared channel (PSSCH) and physical sidelink feedback channel (PSFCH).

With respect to $BW_{S-SSB}$, legacy S-SSB may be used (e.g., one S-SSB containing contiguous RBs) while, for PSCCH/PSSCH, both contiguous RBs and interlaced RBs may be supported. For PSFCH, interlaced RBs may be supported. One key difference between contiguous RB-based transmission and interlaced RB-based transmission may be the calculation method of $BW_{S-SSB}$. For contiguous RB-based transmission, the maximum bandwidth occupied by PSCCH/PSSCH, PSFCH, and S-SSB within 1 MHz is 1 MHz, the $BW_{S-SSB}$ may be calculated as $$BW_{S-SSB} = M_{RB}^{S-SSB} * N_{sc}^{RB} * \Delta f.$$

Similar principle may be used for other channels. For interlaced RB-based transmission, the maximum bandwidth occupied by PSCCH/PSSCH, PSFCH, and S-SSB within 1 MHz may be less than 1 MHz (e.g., only 0.5 MHz is occupied within 1 MHz). In this case, an effective bandwidth may be used with PSD to calculate the power. The effective bandwidth may be $$BW_{S-SSB} = M_{RB}^{S-SSB} * N_{SC}^{RB} * \Delta f / (M_{max,RB}^{1MHz} * N_{sc}^{RB} * \Delta f),$$

where $$M_{max,RB}^{1MHz}$$

denotes the maximum RB number occupied by S-SSB within 1 MHz bandwidth. Similar principle may be used for the other channels.

Accordingly, under the proposed scheme, TPC for S-SSB transmission in SL-U may be expressed as follows:

$$P_{S-SSB,PSD} =$$
$$min(P_{MAX}, P_{O,S-SSB} + 10\log_{10}(2^\mu \cdot M_{RB}^{S-SSB}) + \alpha_{S-SSB} \cdot PL, P_{MAX,PSD})$$

Under a second proposed scheme in accordance with the present disclosure, TPC for SL-U when S-SSB is included in a SL resource pool (e.g., resources used for data/control/feedback channels) may be performed under either of a first option and a second option. In the first option, S-SSB and PSCCH and/or PSSCH may be multiplexed with time-division multiplexing (TDM), and the SL-U power control formula for the case of S-SSB being excluded from the SL resource pool may be reused. In the second option, S-SSB and PSCCH/PSSCH may be multiplexed with frequency-division multiplexing (FDM). For instance, a linear average over corresponding power contribution(s) with the additional consideration of PSD limit may be determined and utilized in TPC. Notably, S-SSB being frequency-division multiplexed with PSCCH and/or PSSCH is a new transmission pattern. Moreover, the power control formula may be impacted considering the additional power sharing introduced by S-SSB.

In the second option, which pertains to frequency-division multiplexed S-SSB and PSSCH transmission occasions, the power of PSSCH transmission may be calculated with the additional consideration of PSD limit, as expressed below:

6

$$P_{PSSCH} = min(P_{MAX}, P_{MAX,CBR}, min(P_{PSSCH,D}, P_{PSSCH,SL}), P_{MAX,PSD})$$

Here, $P_{MAX,CBR}$ denotes a (pre-)configured parameter based on a priority of PSSCH and a channel busy ratio (CBR) range. Additionally, $P_{PSSCH,D}$ and $P_{PSSCH,SL}$ are calculated based on DL and SL pathloss, respectively. Moreover, $P_{MAX,PSD}$ denotes the power calculated based on the PSD limit and bandwidth for the PSSCH transmission occasion. Then, the frequency-division multiplexed S-SSB/PSSCH transmission may be determined as a linear average over the corresponding power contribution(s) of $P_{PSSCH}$. Specifically, the power contribution of S-SSB may be expressed as follows:

$$P_{S-SSB} = 10\log_{10}\left(\frac{M_{RB}^{S-SSB}}{M_{RB}^{PSSCH}}\right) + P_{PSSCH}$$

Moreover, the power contribution of frequency-division multiplexed PSSCH may be expressed as follows:

$$P_{PSSCH2} = 10\log_{10}\left(\frac{M_{RB}^{PSSCH} - M_{RB}^{S-SSB}}{M_{RB}^{PSSCH}}\right) + P_{PSSCH}$$

Here, $P_{PSSCH2}$ denotes the transmit power of the frequency-division multiplexed PSSCH, and $$M_{RB}^{PSSCH}$$

denotes the number of PRBs for the PSSCH. Thus, the transmit power of S-SSB may be a sum of the power of PSSCH transmission and a logarithm base 10 of a ratio between the number of PRBs for the S-SSB and the number of PRBs for the PSSCH. Similarly, the transmit power of the frequency-division multiplexed PSSCH may be a sum of the power of PSSCH transmission and a logarithm base 10 of a ratio between a difference between the numbers of PRBs for the PSSCH and S-SSB and the number of PRBs for the PSSCH.

It is noteworthy that, although the various proposed schemes may be described in the context of S-SSB, the proposed schemes may also be applied in the context of PSCCH, PSSCH as well as PSFCH. In other words, the proposed schemes with respect to controlling PSD for TPC in SL-U communications may also apply in scenarios of PSCCH, PSSCH and/or PSFCH transmissions.

It is also noteworthy that, for legacy SL, the SL resource pool may contain the resources for PSCCH/PSSCH and PSFCH transmission (no S-SSB). For S-SSB, in legacy SL and SL-U, it may be excluded from the resource pool. Alternatively, S-SSB may be included in the resource pool.

In case that S-SSB is excluded from the resource pool, the TPC of each channel may be expressed as shown below for PSSCH, PSCCH and PSFCH. Regarding PSCCH/PSSCH, firstly, the power of PSSCH transmission occasion needs to be determined first, where the corresponding PSCCH is not transmitted in a PSCCH-PSSCH transmission occasion. The TPC may be expressed as follows:

$$P_{PSSCH} = \min(P_{MAX}, P_{MAX,CBR}, \min(P_{PSSCH,D}, P_{PSSCH,SL}), P_{MAX,PSD})$$

Afterwards, the power control for the occasion with both PSSCH/PSCCH may be determined for each of PSSCH and PSCCH as follows:

$$PSSCH: P_{PSSCH2} = 10\log_{10}\left(\frac{M_{RB}^{PSSCH} - M_{RB}^{PSSCH}}{M_{RB}^{PSSCH}}\right) + P_{PSSCH} \text{ [dBm]},$$

and the principle described above applies.

$$PSCCH: P_{PSCCH} = 10\log_{10}\left(\frac{M_{RB}^{PSCCH}}{M_{RB}^{PSSCH}}\right) + P_{PSSCH} \text{[dBm]},$$

and the principle described above applies.

As for PSFCH, the legacy TPC of PSFCH may be followed with additional considering of PSD limitation. Specifically, $P_{MAX}$ in legacy PSFCH TPC may be replaced with min ($P_{MAX,PSD}$, $P_{MAX}$). Here $$M_{RB}^{PSSCH}$$

denotes the number of PRBs for the PSSCH, and $$M_{RB}^{PSCCH}$$

denotes the number of PRBs for the PSCCH. Moreover, in the present disclosure, the term $P_X$ denotes the transmission power used in transmitting X (e.g., $P_{PSSCH}$ denotes the power used in transmitting PSSCH, and $P_{PSCCH}$ denotes the power used in transmitting PSCCH, and so on).

In case that S-SSB is included in the resource pool, the TPC of each channel may be expressed as described below for PSSCH, PSCCH and PSFCH. In an event that S-SSB is time-division multiplexed with PSCCH/PSSCH, the TPC under the case of S-SSB being excluded from the resource pool as described above may be reused. In an event that S-SSB is frequency-domain multiplexed with PSSCH, then the power of PSSCH transmission occasion may be determined first, where the corresponding PSCCH is not transmitted in a PSCCH-PSSCH transmission occasion as described above, which may be the same as the case of S-SSB being excluded from the resource pool. Afterwards, for the case that S-SSB is frequency-domain multiplexed with PSSCH transmission occasion without PSCCH:

$$PSCCH: P_{PSSCH2} = 10\log_{10}\left(\frac{M_{RB}^{PSSCH} - M_{RB}^{PSCCH}}{M_{RB}^{PSSCH}}\right) + P_{PSSCH}\text{[dBm]},$$

and the principle described above applies.

$$S\text{-}SSB: P_{PSCCH} = 10\log_{10}\left(\frac{M_{RB}^{PSCCH}}{M_{RB}^{PSSCH}}\right) + P_{PSSCH}\text{[dBm]},$$

and the principle described above applies.

For the case that S-SSB is frequency-domain multiplexed with PSSCH transmission occasion with PSCCH:

$$PSSCH: P_{PSSCH2} = 10\log_{10}\left(\frac{M_{RB}^{PSSCH} - M_{RB}^{PSCCH} - M_{RB}^{S\text{-}SSB}}{M_{RB}^{PSSCH}}\right) + P_{PSSCH}$$

$$PSCCH: P_{PSCCH} = 10\log_{10}\left(\frac{M_{RB}^{PSCCH}}{M_{RB}^{PSSCH}}\right) + P_{PSSCH}$$

$$S\text{-}SSB: P_{S\text{-}SSB} = 10\log_{10}\left(\frac{M_{RB}^{S\text{-}SSB}}{M_{RB}^{PSSCH}}\right) + P_{PSSCH}$$

In view of the above, it may be appreciated that various proposed schemes of the present disclosure relate to power control of transmissions in SL-U. More specifically, various proposed schemes of the present disclosure relate to the power control for PSCCH and/or PSSCH and/or PSFCH and/or S-SS/PSBCH blocks (i.e., S-SSB) for SL-U under the cases that S-SSB slots are excluded from the SL resource pool (e.g., the resources used for data/control/feedback channels) and/or included in the SL resource pool. For the case that S-SSB slots are excluded from the SL resource pool, the legacy power control methods of PSCCH and/or PSSCH and/or PSFCH and/or S-SSB may be reused with additional considerations of the PSD limitations on the unlicensed spectrum. For the case that SL-U S-SSB slots are included in the SL resource pool, the transmit power may be shared among PSCCH and/or PSSCH and/or S-SSB. For example, the power of S-SSB transmission may be determined as the linear average over the power contributions of all resource blocks in the symbol(s) that carry S-SSB signals. The same principle may also be applied to PSCCH and/or PSSCH and/or PSFCH.

For the case that S-SSB slots are excluded from the SL resource pool, the power control methods of legacy SL S-SSB may be reused when a SL-U synchronization reference UE (SyncRef UE) determines a power for an S-SSB transmission occasion with additional considerations of the PSD limitations on unlicensed spectrum (e.g., 10/17 dBm/MHz) according to the regulation requirements and/or (pre-)configuration. More specifically, the S-SSB power may be determined based on some (pre-)configurations and/or pathloss (e.g., DL pathloss between a base station/gNB and the SyncRef UE (e.g., UE 110 or UE 120) if the SyncRef UE is in the network coverage). For example, a SyncRef UE may determine the power (in dBm) for an S-SSB transmission occasion according to the formula of $$P_{S\text{-}SSB} = \min\left(P_{MAX}, P_{O,S\text{-}SSB} + 10\log_{10}\left(2^{\mu} \cdot M_{RB}^{S\text{-}SSB}\right) + \alpha_{S\text{-}SSB} \cdot PL\right),$$

where $P_{MAX}$ is the (pre-)configured maximum transmit power. $P_{O,S\text{-}SSB}$ and $\alpha_{S\text{-}SSB}$ are two (pre-)configured parameters associated with the pathloss. If the parameter $P_{O,S\text{-}SSB}$ is not (pre-)configured, it means the power control for S-SSB is disable, and then $$P_{S\text{-}SSB} = P_{MAX}. \text{ Also, } M_{RB}^{S\text{-}SSB}$$

denotes the number of PRBs for a S-SSB transmission with SCS configuration μ. PL=$PL_{DL}$ if the SyncRef UE is in the network coverage. For the case that the SyncRef UE in not in the network coverage, the transmit power of S-SSB depends on the (pre-)configuration (e.g., $P_{S\text{-}SSB}=P_{MAX}$).

Additionally, if the PSD limitations on unlicensed spectrum are mandatory, besides the power control methods described above, the additional consideration of the PSD limitations may also be considered. More specifically, the transmit power of S-SSB may not exceed the maximum transmit power $P_{MAX,PSD}$, which can be determined by the PSD limitations. For example, the maximum transmit power with consideration of PSD limitation can be expressed as: $P_{MAX,PSD}=BW_{S\text{-}SSB}\times PSD_{MAX}$, where $BW_{S\text{-}SSB}$ is the bandwidth of S-SSB transmission based on contiguous RB and/or interlaced RB in MHz, and $PSD_{MAX}$ depends on the (pre-) configuration and/or the regulation requirement (e.g., 10/17 dBm/MHz). Therefore, for this example, the power control of S-SSB with consideration of PSD limitations may be expressed as:

$$P_{S\text{-}SSB,PSD} =$$
$$\min\left(P_{MAX}, P_{O,S\text{-}SSB} + 10\log_{10}\left(2^{\mu} \cdot M_{RB}^{S\text{-}SSB}\right) + \alpha_{S\text{-}SSB} \cdot PL, P_{MAX,PSD}\right).$$

Additionally, the legacy power control of SL PSCCH and/or PSSCH and/or PSFCH may be reused for transmission in SL-U with the considerations of PSD limitations in a similar principle.

For the case that S-SSB slots are included in the SL resource pool, the transmit power may be (pre-)configured to be shared among PSCCH and/or PSSCH and/or PSFCH and/or S-SSB, depending on whether they are multiplexed at one transmission occasion. For example, the power for PSCCH and/or PSSCH and/or S-SSB may be determined as the linear average over the corresponding power contribution(s) of all RBs in the transmission occasion. For example, for the case that S-SSB and PSSCH signals are multiplexed in one symbol (e.g., S-SSB-PSSCH transmission occasion), the S-SSB and PSSCH may be transmitted with the same PSD (e.g., with the same power over a resource block) in an S-SSB-PSSCH occasion. For the case that S-SSB, PSCCH and PSSCH signals are multiplexed in one symbol (e.g., S-SSB-PSCCH-PSSCH transmission occasion), the S-SSB, PSCCH and PSSCH may be transmitted with the same PSD in an S-SSB-PSCCH-PSSCH occasion.

In the present disclosure, for a transmission occasion that only PSSCH is transmitted in one symbol, the power of PSSCH transmission may be expressed according to DL and/or SL pathloss. For example, it may be expressed as $P_{PSSCH}=\min (P_{MAX}, P_{MAX,CBR}, \min(P_{PSSCH,D}, P_{PSSCH,SL}))$, where $P_{MAX}$ is the (pre-)configured maximum transmit power, and $P_{MAX,CBR}$ is a (pre-)configured parameter based on a priority level of the PSSCH transmission and a CBR range. If $P_{MAX,CBR}$ is not (pre-)configured, then it may be set as $P_{MAX,CBR}=P_{MAX}$. Moreover, $$P_{PSSCH,D} = P_{O,D} + 10\log_{10}\left(2^{\mu} \cdot M_{RB}^{PSSCH}\right) + \alpha_{D} \cdot PL_{D},$$

where $P_{O,D}$ and $\alpha_{D}$ are the (pre-)configured parameters related to the DL pathloss $PL_{D}$. Additionally, $$M_{RB}^{PSSCH}$$

is a number of resource blocks for the PSSCH transmission occasion. If $P_{O,D}$ is not (pre-)configured, then $P_{PSSCH,D}=\min (P_{CMAX}, P_{MAX,CBR})$. Moreover, $$P_{PSSCH,SL} = P_{O,SL} + 10\log_{10}\left(2^{\mu} \cdot M_{RB}^{PSSCH}\right) + \alpha_{SL} \cdot PL_{SL},$$

where $P_{O,SL}$ and $\alpha_{SL}$ are the (pre-)configured parameters related to the SL pathloss $PL_{SL}$. If $P_{O,SL}$ is not (pre-) configured, then $P_{PSSCH,SL}=\min(P_{CMAX}, P_{MAX,CBR})$. It is noteworthy that the power control of PSSCH may be (pre-) configured to use only DL pathloss, or only SL pathloss, or both DL and SL pathloss. Correspondingly, the power of PSSCH transmission after power control may be expressed as: $P_{PSSCH}=\min(P_{MAX}, P_{MAX,CBR}, P_{PSSCH,D})$ or $P_{PSSCH}=\min (P_{MAX}, P_{MAX,CBR}, P_{PSSCH,SL})$ or $P_{PSSCH}=\min (P_{MAX}, P_{MAX,CBR}, \min(P_{PSSCH,D}, P_{PSSCH,SL}))$, respectively.

In the present disclosure, for the case that S-SSB slots are included in the SL resource pool and S-SSB signals are multiplexed with PSCCH and PSSCH signals in one symbol (e.g., S-SSB-PSCCH-PSSCH transmission occasion), the transmit power of S-SSB and/or PSCCH and/or PSSCH may be determined as the linear average over the corresponding power contribution(s) of $P_{PSSCH}$. For example, the power of an S-SSB transmission on a SL resource pool in an S-SSB-PSCCH-PSSCH transmission occasion may be expressed as $$P_{S\text{-}SSB} = 10\log_{10}\left(\frac{M_{RB}^{S\text{-}SSB}}{M_{RB}^{PSSCH}}\right) + P_{PSSCH},$$

where the parameter $$M_{RB}^{S\text{-}SSB}$$

is the number of resource blocks for the S-SSB in an S-SSB-PSCCH-PSSCH transmission occasion, and $$M_{RB}^{PSSCH}$$

is the number of resource blocks for the S-SSB-PSCCH-PSSCH transmission occasion. Also, the power of PSCCH transmission on a SL resource pool in an S-SSB-PSCCH-PSSCH transmission occasion may be expressed as $$P_{PSCCH} = 10\log_{10}\left(\frac{M_{RB}^{PSCCH}}{M_{RB}^{PSSCH}}\right) + P_{PSSCH},$$

where the parameter $$M_{RB}^{PSCCH}$$

is the number of resource blocks for the PSCCH transmission in an S-SSB-PSCCH-PSSCH transmission occasion. Then, the power of PSSCH transmission on a SL resource pool in an S-SSB-PSCCH-PSSCH transmission occasion may be expressed as $$P_{PSSCH2} = 10\log_{10}\left(\frac{M_{RB}^{PSSCH} - M_{RB}^{S\text{-}SSB} - M_{RB}^{PSCCH}}{M_{RB}^{PSCCH}}\right) + P_{PSSCH}.$$

In the present disclosure, for the case that S-SSB slots are included in the SL resource pool and S-SSB signals are multiplexed with PSSCH signals in one symbol (e.g., S-SSB-PSSCH transmission occasion), the transmit power may be determined as the linear average over the corresponding power contribution of $P_{PSSCH}$. For example, the power of an S-SSB transmission on a SL resource pool in S-SSB-PSSCH transmission occasion may be expressed as $$P_{S\text{-}SSB} = 10\log_{10}\left(\frac{M_{RB}^{S\text{-}SSB}}{M_{RB}^{PSSCH}}\right) + P_{PSSCH}(\text{dBm}),$$

where the parameter $$M_{RB}^{PSSCH}$$

is the number of resource blocks for the S-SSB-PSSCH transmission occasion. Then, the power of a PSSCH transmission on a SL resource pool in an S-SSB-PSSCH transmission occasion may be expressed as $$P_{PSSCH3} = 10\log_{10}\left(\frac{M_{RB}^{PSSCH} - M_{RB}^{S\text{-}SSB}}{M_{RB}^{PSSCH}}\right) + P_{PSSCH}.$$

Alternatively, for another case that S-SSB signals are multiplexed with PSSCH signals, the S-SSB may be (pre-)configured to occupy a set of consecutive interlaces (located at the leading/starting position of the transmission bandwidth) and PSSCH can be (pre-)configured to occupy one or multiple (consecutive) interlace(s) in the rest part of the transmission bandwidth. For example, S-SSB may occupy interlace #0 to interlace #4 within the RB set of {RB #0, RB #19}, and PSSCH may occupy interlace #0 within the RB set of {RB #20, RB #50}. In this case, the (pre-)configured total power (e.g., $P_{MAX}$) may be linearly averaged on the total RBs of the bandwidth firstly. Then, the transmit power of S-SSB and PSSCH may be separately determined as the linear average over the corresponding power contribution of total resource blocks in the S-SSB-PSSCH transmission occasion. For example, the transmit power of S-SSB may be expressed as $$P_{S\text{-}SSB} = 10\log_{10}\left(\frac{M_{RB}^{S\text{-}SSB}}{M_{RB}^{TBW}}\right) + P_{TBW}(\text{dBm}),$$

where the parameter $$M_{RB}^{TBW}$$

is the number of total resource blocks of the S-SSB-PSSCH transmission occasion. Also, $P_{TBW}$ is the (pre-)configured total power over the S-SSB-PSSCH transmission occasion (e.g., $P_{MAX}$). Additionally, the transmission power of PSSCH may be expressed as $$P_{PSSCH} = 10\log_{10}\left(\frac{M_{RB}^{PSSCH}}{M_{RB}^{TBW}}\right) + P_{TBW}(\text{dBm}),$$

where the parameter $$M_{RB}^{PSSCH}$$

is the number of resource blocks for the PSSCH transmission in the S-SSB-PSSCH transmission occasion.

In the present disclosure, the proposed power control methods may be applied to contiguous RB-based transmissions and/or interlaced RB-based transmissions of PSCCH and/or PSSCH and/or PSFCH and/or S-SSB. The utilization principle of the PSD limitations in power control as proposed herein may be applied for the cases that S-SSB slots are excluded from the SL resource pool and/or included in the SL resource pool.

Illustrative Implementations

FIG. 2 illustrates an example communication system 200 having at least an example apparatus 210 and an example apparatus 220 in accordance with an implementation of the present disclosure. Each of apparatus 210 and apparatus 220 may perform various functions to implement schemes, techniques, processes and methods described herein pertaining to power control of SL-U in mobile communications, including the various schemes described above with respect to various proposed designs, concepts, schemes, systems and methods described above, including network environment 100, as well as processes described below.

Each of apparatus 210 and apparatus 220 may be a part of an electronic apparatus, which may be a network apparatus or a UE (e.g., UE 110), such as a portable or mobile apparatus, a wearable apparatus, a vehicular device or a vehicle, a wireless communication apparatus or a computing apparatus. For instance, each of apparatus 210 and apparatus 220 may be implemented in a smartphone, a smart watch, a personal digital assistant, an electronic control unit (ECU) in a vehicle, a digital camera, or a computing equipment such as a tablet computer, a laptop computer or a notebook computer. Each of apparatus 210 and apparatus 220 may also be a part of a machine type apparatus, which may be an IoT apparatus such as an immobile or a stationary apparatus, a home apparatus, a roadside unit (RSU), a wire communication apparatus or a computing apparatus. For instance, each of apparatus 210 and apparatus 220 may be implemented in a smart thermostat, a smart fridge, a smart door lock, a wireless speaker or a home control center. When implemented in or as a network apparatus, apparatus 210 and/or apparatus 220 may be implemented in an eNodeB in an LTE, LTE-Advanced or LTE-Advanced Pro network or in a gNB or TRP in a 5G or 6G network, an NR network or an IoT network.

In some implementations, each of apparatus 210 and apparatus 220 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. In the various schemes described above, each of apparatus 210 and apparatus 220 may be implemented in or as a network apparatus or a UE. Each of apparatus 210 and apparatus 220 may include at least some of those components shown in FIG. 2 such as a processor 212 and a processor 222, respectively, for example. Each of apparatus 210 and apparatus 220 may further include one or more other components not pertinent to the proposed scheme of the present disclosure (e.g., internal power supply, display device and/or user interface device), and, thus, such component(s) of apparatus 210 and apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more CISC or RISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including those pertaining to power control of SL-U in mobile communications in accordance with various implementations of the present disclosure.

In some implementations, apparatus 210 may also include a transceiver 216 coupled to processor 212. Transceiver 216 may be capable of wirelessly transmitting and receiving data. In some implementations, transceiver 216 may be capable of wirelessly communicating with different types of wireless networks of different radio access technologies (RATs). In some implementations, transceiver 216 may be equipped with a plurality of antenna ports (not shown) such as, for example, four antenna ports. That is, transceiver 216 may be equipped with multiple transmit antennas and multiple receive antennas for multiple-input multiple-output (MIMO) wireless communications. In some implementations, apparatus 220 may also include a transceiver 226 coupled to processor 222. Transceiver 226 may include a transceiver capable of wirelessly transmitting and receiving data. In some implementations, transceiver 226 may be capable of wirelessly communicating with different types of UEs/wireless networks of different RATs. In some implementations, transceiver 226 may be equipped with a plurality of antenna ports (not shown) such as, for example, four antenna ports. That is, transceiver 226 may be equipped with multiple transmit antennas and multiple receive antennas for MIMO wireless communications.

In some implementations, apparatus 210 may further include a memory 214 coupled to processor 212 and capable of being accessed by processor 212 and storing data therein. In some implementations, apparatus 220 may further include a memory 224 coupled to processor 222 and capable of being accessed by processor 222 and storing data therein. Each of memory 214 and memory 224 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 214 and memory 224 may include a type of read-only memory (ROM) such as mask ROM, programmable ROM (PROM), erasable programmable ROM (EPROM) and/or electrically erasable programmable ROM (EEPROM). Alternatively, or additionally, each of memory 214 and memory 224 may include a type of non-volatile random-access memory (NVRAM) such as flash memory, solid-state memory, ferroelectric RAM (Fe-RAM), magnetoresistive RAM (MRAM) and/or phase-change memory. Alternatively, or additionally, each of memory 214 and memory 224 may include a UICC.

Each of apparatus 210 and apparatus 220 may be a communication entity capable of communicating with each other using various proposed schemes in accordance with the present disclosure. For illustrative purposes and without limitation, a description of capabilities of apparatus 210, as a first UE (e.g., UE 110), and apparatus 220, as a second UE (e.g., UE 120) of a wireless network, is provided below.

Under certain proposed schemes in accordance with the present disclosure with respect to power control of SL-U in mobile communications, processor 212 of apparatus 210, implemented in or as a UE (e.g., UE 110), may communicate, via transceiver 216, in a SL-U (e.g., with apparatus 220 as UE 120). Moreover, processor 212 may perform, via transceiver 216, a TPC such that a PSD limit is not exceeded in communicating in the SL-U.

In some implementations, in performing the TPC, processor 212 may perform the TPC with a S-SSB excluded from a SL resource pool of resources used in data, control and feedback channel transmissions.

For instance, in performing the TPC, processor 212 may control a S-SSB transmission power in the SL-U as:

$$P_{S-SSB,PSD} =$$

$$\min\left(P_{MAX}, P_{O,S-SSB} + 10\log_{10}\left(2^{\mu} \cdot M_{RB}^{S-SSB}\right) + \alpha_{S-SSB} \cdot PL, P_{MAX,PSD}\right),$$

and $$P_{MAX,PSD} = BW_{S-SSB} \times PSD_{MAX}\,[\text{mW}]\ \text{or}$$

$$P_{MAX,PSD} = 10 * \log 10(BW_{S-SSB}) + PSD_{MAX}\,[\text{dBm}],$$

Here, $P_{MAX}$ may denote a pre-configured maximum transmit power, $P_{O,S-SSB}$ may denote a pre-configured received power target assuming full pathloss compensation for a DL pathloss, $\alpha_{S-SSB}$ may denote an alpha value for the DL pathloss $$M_{RB}^{S-SSB}$$

may denote a number of PRBs used for the S-SSB, $BW_{S-SSB}$ may denote a bandwidth of a S-SSB transmission based on either or both of contiguous RBs and interlaced RBs, and $PSD_{MAX}$ may denote a pre-configured maximum limit on the PSD.

Alternatively, or additionally, in performing the TPC, process 300 may involve processor 212 controlling a PSCCH/PSSCH transmission, where the corresponding PSCCH may be not transmitted in PSCCH-PSSCH transmission occasion, as:

$$P_{PSSCH} =$$

-continued $$\min(P_{MAX}, P_{MAX,CBR}, \min(P_{PSSCH,D}, P_{PSSCH,SL}), P_{MAX,PSD}) \ [dBm].$$

Alternatively, or additionally, in performing the TPC, process 300 may involve processor 212 controlling a PSCCH/PSSCH transmission, where both PSCCH and PSSCH may be transmitted in PSCCH-PSSCH transmission occasion, as:

$$P_{PSSCH2} = 10\log_{10}\left(\frac{M_{RB}^{PSSCH} - M_{RB}^{PSCCH}}{M_{RB}^{PSSCH}}\right) + P_{PSSCH}[dBm], \text{ and}$$

$$P_{PSCCH} = 10\log_{10}\left(\frac{M_{RB}^{PSCCH}}{M_{RB}^{PSSCH}}\right) + P_{PSSCH}[dBm].$$

Alternatively, or additionally, in performing the TPC, process 300 may involve processor 212 controlling a PSFCH transmission as replacing $P_{MAX}$ in a PSFCH TPC formula defined in a Release-16 or Release-17 of a $3^{rd}$ Generation Partnership Project (3GPP) specification by min $(P_{MAX,PSD}, P_{MAX})$.

In some implementations, in performing the TPC, processor 212 may perform the TPC with a PSCCH excluded from a SL resource pool of resources used in data, control and feedback channel transmissions. Alternatively, in performing the TPC, processor 212 may perform the TPC with a PSSCH excluded from the SL resource pool. Alternatively, in performing the TPC, processor 212 may perform the TPC with a PSFCH excluded from the SL resource pool.

In some implementations, in performing the TPC, processor 212 may perform the TPC with a S-SSB included in a SL resource pool of resources used in data, control and feedback channel transmissions. In some implementations, in communicating in the SL-U, processor 212 may communicate with the S-SSB and a PSCCH or PSSCH time-division multiplexed. Alternatively, in communicating in the SL-U, processor 212 may communicate with the S-SSB and the PSCCH or PSSCH frequency-division multiplexed. In case of FDM, in performing the TPC, processor 212 may perform certain operations. For instance, processor 212 may calculate a power of a PSSCH transmission with the PSD limit being one of a plurality of factors used in the calculating. Moreover, processor 212 may determine a linear average over corresponding power contributions of the S-SSB and a frequency-division multiplexed PSSCH.

Illustrative Processes

FIG. 3 illustrates an example process 300 in accordance with an implementation of the present disclosure. Process 300 may represent an aspect of implementing various proposed designs, concepts, schemes, systems and methods described above, whether partially or entirely, including those described above. More specifically, process 300 may represent an aspect of the proposed concepts and schemes pertaining to power control of SL-U in mobile communications. Process 300 may include one or more operations, actions, or functions as illustrated by one or more of blocks 310 and 320. Although illustrated as discrete blocks, various blocks of process 300 may be divided into additional blocks, combined into fewer blocks, or eliminated, depending on the desired implementation. Moreover, the blocks/sub-blocks of process 300 may be executed in the order shown in FIG. 3 or, alternatively in a different order. Furthermore, one or more of the blocks/sub-blocks of process 300 may be executed iteratively. Process 300 may be implemented by or in apparatus 210 and apparatus 220 as well as any variations thereof. Solely for illustrative purposes and without limiting the scope, process 300 is described below in the context of apparatus 210 as a first UE (e.g., UE 110) and apparatus 220 as a second UE (e.g., UE 120). Process 300 may begin at block 310.

At 310, process 300 may involve processor 212 of apparatus 210, implemented in or as a UE (e.g., UE 110), communicating, via transceiver 216, in a SL-U (e.g., with apparatus 220 as UE 120). Process 300 may proceed from 310 to 320.

At 320, process 300 may involve processor 212 performing, via transceiver 216, a TPC such that a PSD limit is not exceeded in communicating in the SL-U.

In some implementations, in performing the TPC, process 300 may involve processor 212 performing the TPC with a S-SSB excluded from a SL resource pool of resources used in data, control and feedback channel transmissions.

For instance, in performing the TPC, process 300 may involve processor 212 controlling a S-SSB transmission power in the SL-U as:

$$P_{S-SSB,PSD} =$$

$$\min\left(P_{MAX}, P_{O,S-SSB} + 10\log_{10}\left(2^{\mu} \cdot M_{RB}^{S-SSB}\right) + \alpha_{S-SSB} \cdot PL, P_{MAX,PSD}\right),$$

and $$P_{MAX,PSD} = BW_{S-SSB} \times PSD_{MAX}[mW] \text{ or}$$

$$P_{MAX,PSD} = 10 * \log10(BW_{S-SSB}) + PSD_{MAX}[dBm],$$

Here, $P_{MAX}$ may denote a pre-configured maximum transmit power, $P_{O,S-SSB}$ may denote a pre-configured received power target assuming full pathloss compensation for a DL pathloss, $\alpha_{S-SSB}$ may denote an alpha value for the DL pathloss, $$M_{RB}^{S-SSB}$$

may denote a number of PRBs used for the S-SSB, $BW_{S-SSB}$ may denote a bandwidth of a S-SSB transmission based on either or both of contiguous RBs and interlaced RBs, and $PSD_{MAX}$ may denote a pre-configured maximum limit on the PSD.

Alternatively, or additionally, in performing the TPC, process 300 may involve processor 212 controlling a PSCCH/PSSCH transmission, where the corresponding PSCCH may be not transmitted in PSCCH-PSSCH transmission occasion, as:

$$P_{PSSCH} =$$

$$\min(P_{MAX}, P_{MAX,CBR}, \min(P_{PSSCH,D}, P_{PSSCH,SL}), P_{MAX,PSD}) \ [dBm].$$

Alternatively, or additionally, in performing the TPC, process 300 may involve processor 212 controlling a PSCCH/PSSCH transmission, where both PSCCH and PSSCH may be transmitted in PSCCH-PSSCH transmission occasion, as:

$$P_{PSSCH2} = 10\log_{10}\left(\frac{M_{RB}^{PSSCH} - M_{RB}^{PSCCH}}{M_{RB}^{PSSCH}}\right) + P_{PSSCH}[dBm], \text{ and}$$

-continued $$P_{PSCCH} = 10\log_{10}\left(\frac{M_{RB}^{PSCCH}}{M_{RB}^{PSSCH}}\right) + P_{PSSCH}\text{[dBm]}.$$

Alternatively, or additionally, in performing the TPC, process 300 may involve processor 212 controlling a PSFCH transmission as replacing $P_{MAX}$ in a PSFCH TPC formula defined in a Release-16 or Release-17 of a $3^{rd}$ Generation Partnership Project (3GPP) specification by min $(P_{MAX,PSD}, P_{MAX})$.

In some implementations, in performing the TPC, process 300 may involve processor 212 performing the TPC with a PSCCH excluded from a SL resource pool of resources used in data, control and feedback channel transmissions. Alternatively, in performing the TPC, process 300 may involve processor 212 performing the TPC with a PSSCH excluded from the SL resource pool. Alternatively, in performing the TPC, process 300 may involve processor 212 performing the TPC with a PSFCH excluded from the SL resource pool.

In some implementations, in performing the TPC, process 300 may involve processor 212 performing the TPC with a S-SSB included in a SL resource pool of resources used in data, control and feedback channel transmissions. In some implementations, in communicating in the SL-U, process 300 may involve processor 212 communicating with the S-SSB and a PSCCH or PSSCH time-division multiplexed. Alternatively, in communicating in the SL-U, process 300 may involve processor 212 communicating with the S-SSB and the PSCCH or PSSCH frequency-division multiplexed. In case of FDM, in performing the TPC, process 300 may involve processor 212 performing certain operations. For instance, process 300 may involve processor 212 calculating a power of a PSSCH transmission with the PSD limit being one of a plurality of factors used in the calculating. Moreover, process 300 may involve processor 212 determining a linear average over corresponding power contributions of the S-SSB and a frequency-division multiplexed PSSCH.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

communicating, by a processor of a user equipment (UE), in a sidelink unlicensed spectrum (SL-U); and performing, by the processor, a transmit power control (TPC) such that a power spectral density (PSD) limit is not exceeded in communicating in the SL-U, wherein the performing of the TPC comprises performing the TPC with a sidelink synchronization signal block (S-SSB) excluded from a sidelink resource pool of resources used in data, control and feedback channel transmissions, wherein the performing of the TPC further comprises controlling a PSCCH/PSSCH transmission, and where the corresponding PSCCH is not transmitted in PSCCH-PSSCH transmission occasion, as:

$$P_{PSSCH} = \min(P_{MAX}, P_{MAX,CBR}, \min(P_{PSSCH,D}, P_{PSSCH,SL}), P_{MAX,PSD}) \text{ [dBm]}.$$

2. The method of claim 1, wherein the performing of the TPC further comprises controlling a S-SSB transmission power in the SL-U as:

$$P_{S-SSB,PSD} =$$

$$\min\left(P_{MAX}, P_{O,S-SSB} + 10\log_{10}\left(2^\mu \cdot M_{RB}^{S-SSB}\right) + \alpha_{S-SSB} \cdot PL, P_{MAX,PSD}\right),$$

and $$P_{MAX,PSD} = BW_{S-SSB} \times PSD_{MAX} \text{ [mW] or}$$

$$P_{MAX,PSD} = 10 * \log10(BW_{S-SSB}) + PSD_{MAX} \text{ [dBm]},$$

wherein:

$P_{MAX}$ denotes a pre-configured maximum transmit power, $P_{O,S-SSB}$ denotes a pre-configured received power target assuming full pathloss compensation for a downlink (DL) pathloss, $\alpha_{S-SSB}$ denotes an alpha value for the DL pathloss, $$M_{RB}^{S-SSB}$$

denotes a number of physical resource blocks (PRBs) used for the S-SSB, $BW_{S-SSB}$ denotes a bandwidth of a S-SSB transmission based on either or both of contiguous resource blocks (RBs) and interlaced RBs, and $PSD_{MAX}$ denotes a pre-configured maximum limit on the PSD.

3. The method of claim 1, wherein the performing of the TPC further comprises controlling a PSCCH/PSSCH transmission, where both PSCCH and PSSCH are transmitted in PSCCH-PSSCH transmission occasion, as:

$$P_{PSSCH2} = 10\log_{10}\left(\frac{M_{RB}^{PSSCH} - M_{RB}^{PSCCH}}{M_{RB}^{PSSCH}}\right) + P_{PSSCH} \text{ [dBm], and}$$

$$P_{PSCCH} = 10\log_{10}\left(\frac{M_{RB}^{PSCCH}}{M_{RB}^{PSSCH}}\right) + P_{PSSCH} \text{ [dBm].}$$

4. The method of claim 1, wherein the performing of the TPC further comprises controlling a PSFCH transmission as replacing $P_{MAX}$ in a PSFCH TPC formula defined in a Release-16 or Release-17 of a 3$^{rd}$ Generation Partnership Project (3GPP) specification by min ($P_{MAX,PSD}$, $P_{MAX}$).

5. The method of claim 1, wherein the performing of the TPC comprises performing the TPC with a sidelink synchronization signal block (S-SSB) included in a sidelink resource pool of resources used in data, control and feedback channel transmissions.

6. The method of claim 5, wherein the communicating in the SL-U comprises communicating with the S-SSB and a physical sidelink control channel (PSCCH) or physical sidelink shared channel (PSSCH) time-division multiplexed.

7. The method of claim 5, wherein the communicating in the SL-U comprises communicating with the S-SSB and a physical sidelink control channel (PSCCH) or physical sidelink shared channel (PSSCH) frequency-division multiplexed.

8. The method of claim 7, wherein the performing of the TPC further comprises:

calculating a power of a PSSCH transmission with the PSD limit being one of a plurality of factors used in the calculating; and determining a linear average over corresponding power contributions of the S-SSB and a frequency-division multiplexed PSSCH.

9. An apparatus implementable in a user equipment (UE), comprising:

a transceiver configured to communicate wirelessly; and a processor coupled to the transceiver and configured to perform, via the transceiver, operations comprising:

communicating, via the transceiver, in a sidelink unlicensed spectrum (SL-U); and performing, via the transceiver, a transmit power control (TPC) such that a power spectral density (PSD) limit is not exceeded in communicating in the SL-U, wherein the performing of the TPC comprises performing the TPC with a sidelink synchronization signal block (S-SSB) excluded from a sidelink resource pool of resources used in data, control and feedback channel transmissions, wherein the performing of the TPC further comprises controlling a PSCCH/PSSCH transmission, and where the corresponding PSCCH is not transmitted in PSCCH-PSSCH transmission occasion, as:

$$P_{PSSCH} =$$

$$\min(P_{MAX}, P_{MAX,CBR}, \min(P_{PSSCH,D}, P_{PSSCH,SL}), P_{MAX,PSD}) \text{ [dB}m\text{]}.$$

10. The apparatus of claim 9, wherein the performing of the TPC further comprises controlling a S-SSB transmission power in the SL-U as:

$$P_{S-SSB,PSD} =$$

$$\min\left(P_{MAX}, P_{O,S-SSB} + 10\log_{10}\left(2^\mu \cdot M_{RB}^{S-SSB}\right) + \alpha_{S-SSB} \cdot PL, P_{MAX,PSD}\right),$$

and $$P_{MAX,PSD} = BW_{S-SSB} \times PSD_{MAX} \text{ [mW] or}$$

$$P_{MAX,PSD} = 10 * \log10(BW_{S-SSB}) + PSD_{MAX} \text{ [dBm]},$$

wherein:

$P_{MAX}$ denotes a pre-configured maximum transmit power, $P_{O,S-SSB}$ denotes a pre-configured received power target assuming full pathloss compensation for a downlink (DL) pathloss, $\alpha_{S-SSB}$ denotes an alpha value for the DL pathloss, $$M_{RB}^{S-SSB}$$

denotes a number of physical resource blocks (PRBs) used for the S-SSB, $BW_{S-SSB}$ denotes a bandwidth of a S-SSB transmission based on either or both of contiguous resource blocks (RBs) and interlaced RBs, and $PSD_{MAX}$ denotes a pre-configured maximum limit on the PSD.

11. The apparatus of claim 9, wherein the performing of the TPC further comprises controlling a PSCCH/PSSCH transmission, where both PSCCH and PSSCH are transmitted in PSCCH-PSSCH transmission occasion, as:

$$P_{PSSCH2} = 10\log_{10}\left(\frac{M_{RB}^{PSSCH} - M_{RB}^{PSCCH}}{M_{RB}^{PSSCH}}\right) + P_{PSSCH}[\text{dBm}], \text{ and}$$

$$P_{PSCCH} = 10\log_{10}\left(\frac{M_{RB}^{PSCCH}}{M_{RB}^{PSSCH}}\right) + P_{PSSCH}[\text{dBm}].$$

12. The apparatus of claim 9, wherein the performing of the TPC further comprises controlling a PSFCH transmission as replacing $P_{MAX}$ in a PSFCH TPC formula defined in a Release-16 or Release-17 of a 3$^{rd}$ Generation Partnership Project (3GPP) specification by min ($P_{MAX,PSD}$, $P_{MAX}$).

13. The apparatus of claim 9, wherein the performing of the TPC comprises performing the TPC with a sidelink synchronization signal block (S-SSB) included in a sidelink resource pool of resources used in data, control and feedback channel transmissions.

14. The apparatus of claim 13, wherein the communicating in the SL-U comprises communicating with the S-SSB and a physical sidelink control channel (PSCCH) or physical sidelink shared channel (PSSCH) time-division multiplexed.

15. The apparatus of claim 13, wherein the communicating in the SL-U comprises communicating with the S-SSB and a physical sidelink control channel (PSCCH) or physical sidelink shared channel (PSSCH) frequency-division multiplexed.

16. The apparatus of claim 15, wherein the performing of the TPC further comprises:

calculating a power of a PSSCH transmission with the PSD limit being one of a plurality of factors used in the calculating; and determining a linear average over corresponding power contributions of the S-SSB and a frequency-division multiplexed PSSCH.

* * * * *